United States Patent [19]
Takaishi et al.

[11] 3,894,098
[45] July 8, 1975

[54] PROCESS FOR PREPARATION OF 1-METHYLADAMANTANE

[75] Inventors: Naotake Takaishi; Yoshiaki Inamoto, both of Wakayama; Kiyoshi Tsuchihashi, Kainan, all of Japan

[73] Assignee: Kao Soap Co., Ltd., Tokyo, Japan

[22] Filed: June 24, 1974

[21] Appl. No.: 482,434

[30] Foreign Application Priority Data
June 27, 1973  Japan.............................. 48-72523

[52] U.S. Cl....................... 260/666 M; 260/666 LY
[51] Int. Cl.......................... C07c 5/24; C07c 13/54
[58] Field of Search.................. 260/666 M, 666 LY

[56] References Cited
UNITED STATES PATENTS
3,356,751  12/1967  Schneider...................... 260/666 M OTHER PUBLICATIONS
Derek J. Cash et al., Tetrahedron Letters, No. 52, pp. 6445–6451, 1966.

*Primary Examiner*—Veronica O'Keefe
*Attorney, Agent, or Firm*—Woodhams, Blanchard and Flynn

[57] ABSTRACT

A process for the preparation of 1-methyladamantane, a known useful compound, by isomerizing 2-methyltricyclo-[5.2.1.0$^{2,6}$]decane in the presence of an anhydrous aluminum halide in a halogenated lower hydrocarbon solvent.

6 Claims, No Drawings

PROCESS FOR PREPARATION OF 1-METHYLADAMANTANE

BACKGROUND OF THE INVENTION

1. Field of the Invention

This invention relates to a process for isomerizing 2-methyl-tricyclo[5.2.1.0$^{2,6}$] decane (I), which is a novel tricyclic hydrocarbon, to 1-methyladamantane (II) is a very high yield by the one-stage reaction represented by the following reaction scheme (1):

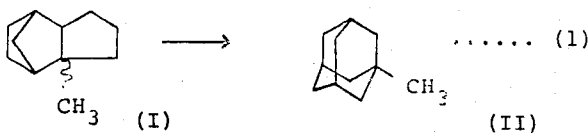

2. Description of the Prior Art

Reports on the isomerization of methyl-substituted trimethylenenorbornane(x-methyltricyclo[5.2.1.0$^{2,6}$]-decane) have been published by Schleyer at al. (Tetrahedron Letters, 305 (1961)), Schneider et al (U.S. Pat. No. 3 356 751) and Petrov et al. (Neftekhimiya, 11, 163 (1971)).

However, 2-methyl-tricyclo[5.2.1.0$^{2,6}$]decane (I) used in the process of this invention is a novel compound and no isomerization reaction of this compound has been known in the art.

SUMMARY OF THE INVENTION

We have discovered that 2-methyl-tricyclo[5.2.1.0$^{2,6}$]decane (I), which is a novel tricyclic hydrocarbon, can be isomerized to 1-methyladamantane (II), a known useful compound, under mild reaction conditions in an almost quantitative yield. More specifically, in accordance with this invention, there is provided a process for preparing 1-methyladamantane (II) in an isolation yield of higher than 90 percent by isomerizing 2-methyl-tricyclo[5.2.1.0$^{2,6}$]decane (I) in the presence of an aluminum halide as a catalyst, in a halogenated lower hydrocarbon solvent.

The starting 2-methyl-tricyclo[5.2.1.0$^{2,6}$]decane used in this invention includes two stereoisomers, 2-endo-methylexo-tricyclo[5.2.1.0$^{2,6}$]decane represented by the following formula (Ia) and 2-exo-methyl-endo-tricyclo[5.2.1.0$^{2,6}$]decane represented by the following formula (Ib):

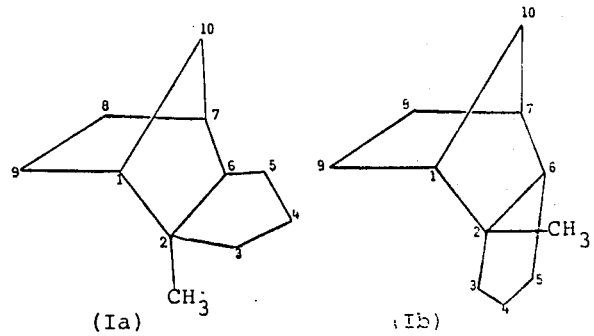

As a result of our experiments, it has been found that these isomers (Ia) and Ib) can be isomerized under the same specific reaction conditions to obtain 1-methyladamantane, in the same yield, whether the isomers are used separately or are used in the form of a mixture of these two isomers in any weight ratio. It has also been found that when the endotrimethylene isomer represented by the formula (Ib) is used alone or when a mixture of isomers (Ia) and (Ib) is used as the starting material for isomerization, the starting material is at first transformed substantially into the exo-trimethylene isomer (Ia), which is then isomerized to 1-methyladamantane. More specifically, it has been found that in the synthesis of 1-methyladamantane from a starting material of (Ib) or a mixture composed of (Ia) and (Ib), if the reaction is stopped at an appropriate point or the reaction is carried out under milder conditions than those adopted for the isomerization to 1-methyladamantane, only the exo-trimethylene isomer (Ia) can be substantially obtained from the reaction mixture. Accordingly, in the process of this invention it is possible to use as the starting material any of (1) the exo-trimethylene isomer (Ia), (2) the endo-trimethylene isomer (Ib) and (3) a mixture of both isomers (Ia) and (Ib) in any weight ratio.

The starting material to be used in the process of this invention, namely 2-endo-methyl-exo-tricyclo[5.2.1.0$^{2,6}$]decane (Ia), 2-exo-methyl-endo-tricyclo[5.2.1.0$^{2,6}$]decane (I[b), and mixtures thereof, can be synthesized, for example, by the following method. First, 2-exo-hydroxy-2,3-dihydro-exo-dicyclopentadiene (IV) prepared by addition of water to endodicyclopentadiene (III) (H.A. Bruson & T.W. Riener, JACS, 67, 723 (1945); P.D. Bartlett & A. Schneider, ibid, 68, 6 (1946); F. Bergmann & H. Japhe, ibid., 69, 1826 (1947)), in the presence of an acid, is hydrogenated to form 8-exo-hydroxyexo-tricyclo[5.2.1.0$^{2,6}$]decane (V) (H.A. Bruson & T.W. Riener, JACS, 67, 723 (1944)). Then, the alcohol (V) is converted into tricyclo[5.2.1.0$^{2,6}$]decane-2-carboxylic acid (VI) by the Koch reaction (H. Koch & W. Haaf, Ann., 638, 111 (1960), and the acid (VI) is esterified. The resulting ester (VII) is reduced to an alcohol (VIII) with lithium aluminum hydride. The alcohol (VIII) is treated with p-toluene-sulfonic acid chloride to give a tosyl ester (IX). The tosyl ester (IX) is then reduced with lithium aluminum hydride to obtain a mixture composed of 57 wt. percent of the exo-trimethylene isomer (Ia) and 43 wt. percent of the endo-trimethylene isomer (Ib.) Both the isomers can be separated from each other, if desired, for example, by preparative gas chromatography. The above method of synthesis is shown in Chart A.

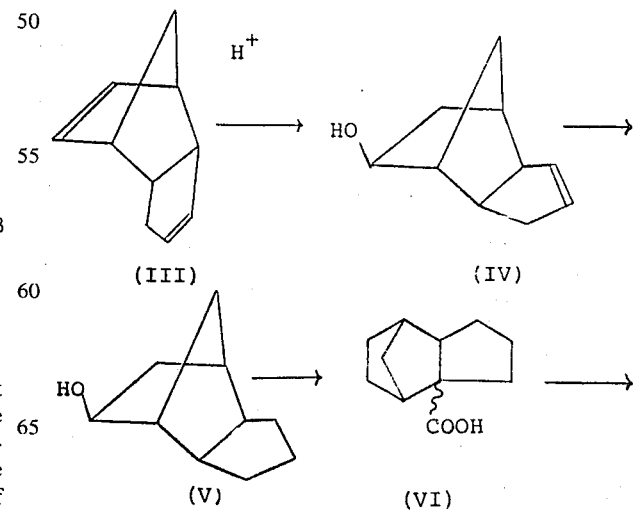

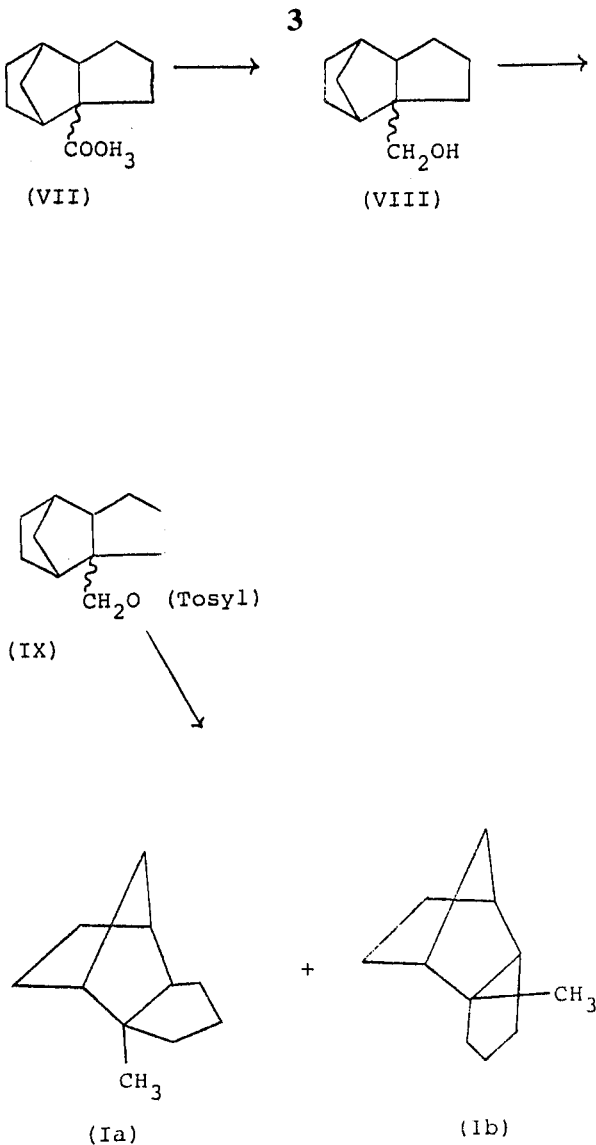

The catalyst used in the isomerization process of this invention is an uncomplexed aluminum halide (aluminum chloride or aluminum bromide). The present invention does not require the use of complex sludge catalysts, which are commonly used in analogous adamantane rearrangements. More specifically, in this invention it is unnecessary to use complex catalysts, the conditions of preparation of which delicately influence the catalytic activity, such as binary catalysts, e.g., aluminum halide-hydrogen halide catalysts and ternary catalysts, e.g., aluminum halide-hydrogen halide-tertiary carbon-containing lower hydrocarbon catalysts. Further, a sufficiently high catalytic activity can be obtained when the simple aluminum halide catalyst is used in such a small amount as 1/20 to 1/5 of the amount necessary in the conventional methods. In view of the foregoing, the process of this invention is highly practical for industrial use.

As the aluminum halide catalyst, it is preferred to employ aluminum chloride and aluminum bromide in the process of this invention. The amount of catalyst used is in the range of 0.01 to 0.5 mole, preferably 0.05 to 0.1 mole, per one mole of the starting material 2-methyl-tricyclo[$5.2.1.0^{2,6}$]decane (I).

As the solvent, there are effectively employed halogenated lower hydrocarbons, preferably chlorinated or brominated hydrocarbons containing 1 to 6 carbon atoms such as methylene chloride, methylene bromide, chloroform, 1,2-dichloroethane, 1,2-dibromoethane, 1,2-dichloropropane, 1,3-dichloropropane, 1,3-dichlorobutane, 2-methyl-1,4-dichlorobutane, chlorocyclohexane and the like. The amount of solvent employed is from 5 to 100 times the weight of the starting material Ia, Ib, or mixtures thereof.

The isomerization proceeds at a temperature ranging from $-10°$ to $120°C$., but it is preferred that the reaction is carried out at a temperature ranging from $20°$ to $60°C$.

According to the process of this invention, no appreciable amounts of polymeric materials or decomposition products are formed as byproducts, and 1-methyladamantane of high purity can be obtained in an almost quantitative yield.

This invention will now be further described by reference to the following illustrative Examples. In addition, the method for the synthesis of 2-methyl-tricyclo[$5.2.1.0^{2,6}$]decane (I) used as the starting substance in the process of this invention will be described in the following illustrative preparations.

Preparation 1

This preparation describes the synthesis of tricyclo[$5.2.1.0^{2,6}$]decane-2-carboxylic acid (VI) by the Koch reaction.

A 2 liter, four-necked, round-bottomed flask is charged with 1178 g of concentrated sulfuric acid, and then 114 g (0.75 mole) of 8-exo-hydroxy-exo-tricyclo[$5.2.1.0^{2,6}$]decane (V) dissolved in 150 ml of n-hexane, together with 207 g of formic acid, is added dropwise to the charge in the flask over a period of 1.5 hours while maintaining the temperature at $10°$ to $14°C$.

The mixture is stirred at the above temperature for 1 hour, and then the reaction mixture is poured onto 3 Kg of ice. The precipitated crystals and the organic layer are extracted twice with 1 l of ether. The extract is washed with water and extracted 3 times and with 1 l of 5 percent aqueous sodium hydroxide solution. The alkaline liquid is made strongly acidic by use of 37 percent hydrochloric acid, and the resulting precipitate is separated by filtration, washed with water and air dried to obtain 91 g (the yield:67 %) of crude tricyclo[$5.2.1.0^{2,6}$]decane-2-carboxylic acid (VI).

Elemental Analysis

Found: C, 73.3 ; H, 8.9 %.
Calculated for $C_{11}H_{16}O_2$: C, 73.30 ; H, 8.95 %.

Preparation 2 [Esterification of tricyclo[$5.2.1.0^{2,6}$] decane-2-carboxylic acid (VI)]

In a 500 ml, round-bottomed flask, 88 g (0.49 mole) of the carboxylic acid (VI) obtained in Preparation 1 is mixed with 119 g (1 mole) of thionyl chloride, and the mixture is heated and refluxed on a hot water bath for 1 hour. Then, excess thionyl chloride is distilled off first under atmospheric pressure and then under reduced pressure. Then, 100 ml of benzene is added to the residue and the benzene is distilled off under reduced pressure. This procedure is repeated 3 times, to remove any trace of dissolved thionyl chloride. Then, 200 ml of methanol is gradually added dropwise under cooling. After completion of the dropwise addition, the temperature is gradually elevated, and the reaction mixture is refluxed for 1 hour, following which methanol is distilled off and the residue is subjected to fractionation to obtain 79 g (yield: 83 percent) of the product consisting of 57 wt. percent (based on the gas chromatogram area) of 2-endo-(methoxycarbonyl)-exo-tricyclo[5.2.1.0$^{2,6}$]-decane (VIIa) and 43 wt. % (based on the gas chromatogram area) of 2-exo-(methoxycarbonyl)-endo-tricyclo[5.2.1.0$^{2,6}$]decane (VIIb) from a fraction boiling at 80°– 81°C. at 0.2 mm Hg. The conformation of the methoxycarbonyl group in these compounds is assigned according to the conformation in the corresponding final methyl-substituted product.

Elemental-Analysis
  Found: C, 73.8; H, 9.4%.
  Calculated for $C_{12}H_{18}O_2$: C, 74.19; H, 9.34%.

Preparation 3
  [Synthesis of alcohol (VIII) by reduction with lithium aluminum hydride]

A 1 liter, round-bottomed flask is charged with 9.83 g (0.26 mole) of lithium aluminum hydride and 400 ml of ether, and a solution of 50.25 g (0.26 mole) of the ester (VII) obtained in Preparation 2 in 30 ml of ether is gradually added dropwise over a period of 30 minutes at such a rate that the refluxing condition is maintained. After completion of the dropwise addition, the reaction mixture is refluxed for 1.5 hours. The reaction mixture is allowed to cool, and 20 ml of ethyl acetate is gradually added dropwise and then 35 ml of water is gradually added dropwise. The resulting precipitate is separated by filtration, and the filtrate is left aside to separate into two phases. The organic layer is taken, and dried over anhydrous sodium sulfate and the solvent is distilled off to recover 38.3 g (yield: 87.8 percent) of a mixture melting at 58° – 61°C., which consists of 60.8 wt. percent (based on the gas chromatogram area) of 2-endo-(hydroxymethyl)-exo-tricyclo[5.2.1.0$^{2,6}$]decane (VIIIa) and 39.2 wt. percent (based on the gas chromatogram area) of 2-exo-(hydroxymethyl)-endo-tricyclo[5.2.1.0$^{2,6}$]decane (VIIIb). The conformation of the hydroxymethyl group in these compounds is assigned according to the conformation in the corresponding final methyl-substituted product.

Elemental Analysis
  Found: C, 79.5; H, 10.9%.
  Calculated for $C_{11}H_{18}O$: C, 79.46; H, 10.92%.

Preparation 4
  [Synthesis of tosyl ester (IX)]

A 500 ml. round-bottomed flask is charged with 34.9 g (0.21 mole) of the alcohol (VIII) obtained in Preparation 3 and 100 ml of pyridine, and then 50 g (0.26 mole) of p-toluenesulfonyl chloride is added dropwise at a rate sufficient to maintain the temperature between 20° and 25°C. After completion of the dropwise addition, the mixture is stirred for 15 hours at room temperature. The reaction mixture is gradually added to 390 ml of a 15% aqueous solution of hydrochloric acid under cooling. The resulting precipitate is washed with water and air-dried to give 66.9 g (yield: 79.7 percent) of crude tricyclo[5.2.1.0$^{2,6}$]decane-2-yl-methyl ptoluenesulfonate (IX).

Melting Point
  77° – 80°C. (sealed tube)
Elemental Analysis
  Found: C, 67.4 ; H, 7.6 ; S, 9.4%.
  Calculated for $C_{18}H_{24}O_3S$ : C, 67.46; H, 7.55; S, 10.00%.

Preparation 5
  [Synthesis of exo-trimethylene isomer (Ia) and endo-trimethylene isomer (Ib) from tosyl ester (IX)]

A 500 ml. round-bottomed flask is charged with 1.94 g (0.051 mole) of lithium aluminum hydride and 200 ml of tetrahydrofuran, and the mixture is stirred. Then, a solution of 16.2 g (0.051 mole of tricyclo[5.2.1.0$^{2,6}$]-dec-2-yl-methyl p-toluenesulfonate (IX) obtained in Preparation 4 in 20 ml of tetrahydrofuran is gradually added dropwise at such a rate that the refluxing condition is maintained. After completion of the dropwise addition, the mixture is heated and refluxed for 25 hours, and then the mixture is allowed to cool. Then, 5 ml of ethyl acetate is gradually added to the mixture dropwise and 10 ml of water is gradually added dropwise. The resulting precipitate is separated by filtration, and the majority of the tetrahydrofuran is distilled off from the filtrate. The residue is left aside and the separated organic layer is recovered. By recovering a fraction boiling at 60° - 62°C. at 5 mmHg, there is obtained 3.57 g (yield: 46.5 percent) of a mixture consisting of 49.7 wt.% (based on the gas chromatogram area) of 2-endo-methyl-exo-tricyclo[5.2.1.0$^{2,6}$]decane (Ia) and 50.3 wt. percent (based on the gas chromatogram area) of 2-exo-methylendo-tricyclo[5.2.1.0$^{2,6}$]decane (Ib). Compounds (Ia) and (Ib) are separated from each other by gas chromatography (containing 30 percent of Carbowax 20 M; the column temperature being 80°C.). 2-endo-methyl-exo-tricyclo[5.2.1.0$^{2,6}$]decane (Ia):

Melting Point
  Liquid at room temperature
Elemental Analysis
  Found: C, 87.2; H, 11.8%.
  Calculated for $C_{11}H_{18}$: C, 87.92; H, 12.08%.
NMR Spectrum (CDCl$_3$ solvent) δ 0.94 (singlet, 3H, -CH$_3$)
IR Spectrum (cm$^{-1}$)
  2950, 2850, 1475, 1460, 1375, 1300
Mass Spectrum (m/e) (relative intensity)
  150 (33.5), 135 (26.8), 109 (96.7), 82 (100), 67 (89.5)  2-exo-methyl-endo-tricyclo[5.2.1.0$^{2,6}$]decane (Ib):

Melting Point 89° –92°C.
Elemental Analysis
  Found: C, 87.2; H, 11.8%. Calculated for $C_{11}H_{18}$: C, 87.92; H, 12.08%.
NMR Spectrum (CDCl$_3$ solvent)
  δ 0.99 (singlet, 3H, -CH$_3$)
IR Spectrum (cm$^{-1}$)
  2950, 2850, 1485, 1470, 1460, 1375, 1300
Mass Spectrum (m/e) (relative intensity)
  150 (28.2), 135 (24.5), 109 (78.5), 82 (100.0), 67 (96.3)

The structures of (Ia) and (Ib) are further deduced by comparing them with endo- and exo-tricyclo[5.2.1.0$^{2,6}$]decane (trimethyleneorbornanes) with respect to various properties and by taking into consideration their similarities to these reference compounds. More specifically, in view of the following evidences;

1. IR and NMR spectra,
  2. the retention time in the gas chromatography,
  3. the fact that the molecular stability of the exo-trimethylene isomer is higher than that of the endo-trimethylene isomer, and
  4. the melting point of the endo-trimethylene isomer is higher than that of the exo-trimethylene isomer, the isomer having properties similar to those of exo-trimethylenenorbornane is assigned the structure I$a$ and the isomer having properties similar to those of endo-trimethyleneorbornane the structure I$b$.

preparation 6

1.5 g (0.01 mole) of a mixture of (I$a$) and (I$b$) obtained in Preparation 5 is dissolved in 20 ml of methylene chloride, and the solution is stirred at 0°C. Then, 130 mg (0.001 mole) of anhydrous aluminum chloride is added to the solution and the mixture is stirred at room temperature for 1 hour. The reaction mixture is poured onto 50 ml of ice water, and after separation of the organic layer, the water layer is extracted with methylene chloride. The methylene chloride extract is combined with the above separated organic layer, and the mixture is washed with a saturated aqueous sodium hydrogencarbonate and with water, and is dried over anhydrous sodium sulfate. After removal of the methylene chloride, the residue is fractionally distilled. There is obtained 1.5 g (yield: 100%) of the crude product (I$a$). In the gas chromatogram of the product there is not observed the peak of (I$b$), and all of the NMR spectrum, IR spectrum and mass spectrum of the product are in agreeement with those of 2 -endomethyl-exo-tricyclo[5.2.1.0$^{2,6}$]decane (I$a$).

EXAMPLE 1

1 g (6.7 mmole) of a mixture of 2-endo-methyl-exo-tricyclo[5.2.1.0$^{2,6}$]decane (I$a$) and 2-exo-methyl-endo-tricyclo[5.2.1.0$^{2,6}$]decane (I$b$)obtained in Preparation 5 is dissolved in 10 ml of methylene chloride, and the solution is stirred at 0°C. Then, 0.087 g (0.67 mmole) of anhydrous aluminum chloride is added to the solution, and the mixture is heated and refluxed under stirring for 3 hours. The reaction mixture is allowed to cool and then is added to 20 ml of ice water. After separation of the organic layer, the water layer is extracted with methylene chloride, and the methylene chloride extract is combined with the above separated organic layer. The mixture is washed with a saturated aqeuous sodium hydrogencarbonate and with water, and is dried over anhydrous sodium sulfate. The residue recovered by distillation of methylene chloride is sublimed to obtain 0.92 g (yield: 92%) of 1-methyladamantane. All of the IR spectrum, NMR spectrum and mass spectrum are in agreement with those of the authentic sample of 1-methyladamantane.

EXAMPLE 2

1.5 g (0.01 mole) of 2-endo-methyl-exo-tricyclo[5.2.1.0$^{2,6}$]decane (I$a$) obtained in Preparation 6 is dissolved in 20 ml of methylene chloride, and the solution is stirred at 0°C. Then, 130 mg (1 mmole) of anhydrous aluminum chloride is added to the solution and the mixture is heated and refluxed under stirring for 3 hours. The reaction mixture is allowed to cool and then is added to 50 ml of ice water. After separation of the organic layer, the water layer is extracted with methylene chloride. The methylene chloride extract is combined with the above separated organic layer, and the mixture is washed with a saturated aqueous sodium hydrogencarbonate and with water, and is dried over anhydrous sodium sulfate.

The residue obtained by distillation of methylene chloride is sublimed to obtain 1.38 g (yield: 92 percent) of 1-methyladamantane. All of the IR spectrum, NMR spectrum and mass spectrum of the product are in agreement with those of the authentic sample.

EXAMPLE 3

300 mg (2 mmole) of 2-exo-methyl-endo-tricyclo[5.2.1.0$^{2,6}$]decane (I$b$) separated on a preparative gas chromatography in Preparation 5 is dissolved in 10 ml of methylene chloride, and the solution is stirred at 0°C. Then, 26 mg (0.2 mmole) of anhydrous aluminum chloride is added to the solution and the mixture is heated and refluxed under stirring for 3 hours. The reaction mixture is allowed to cool and then is added to 20 ml of ice water. After separation of the organic layer, the water layer is extracted with methylene chloride, and the methylene chloride extract is combined with the above separated organic layer. The mixture is washed with a saturated aqueous sodium hydrogencarbonate and with water, and is dried over anhydrous sodium sulfate. The residue obtained by distillation of methylene chloride is sublimed and purified to obtain 270 mg (yield: 90 percent) of 1-methyladamantane. All of the IR spectrum, NMR spectrum and mass spectrum of the product are in agreement with those of the authentic sample.

The embodiments of the invention in which an exclusive property or privilege is claimed are defined as follows:

1. The process for preparing 1-methyladamantane, which comprises isomerizing 2-methyl-tricyclo[5.2.1.0$^{2,6}$]decane in the presence of an anhydrous aluminum halide catalyst in a halogenated lower hydrocarbon solvent.

2. The process according to claim 1 for preparing 1-methyladamantane which consists of causing 2-methyl-tricyclo[5.2.1.0$^{2,6}$]decane, dissolved in a halogenated lower hydrocarbon solvent, to isomerize in the presence of an anhydrous aluminum halide catalyst, at a temperature of from −10° to +120°C until said 2-methyl-tricyclo[5.2.1.0$^{2,6}$]decane is substantially completely transformed to 1-methyladamantane and recovering 1-methyladamantane from the reaction mixture.

3. The process according to claim 2 in which the catalyst is used in the amount of 0.01 to 0.5 mole per mole of 2-methyltricyclo[5.2.1.0$^{2,6}$]decane.

4. The process according to claim 3, in which the solvent is selected from the group consisting of methylene chloride, methylene bromide, chloroform, 1,2-dichloroethane, 1,2-dibromoethane, 1,2-dichloropropane, 1,3-dichloropropane, 1,4-dichlorobutane, 2-methyl-1,4-dichlorobutane and chlorcyclohexane.

5. The process according to claim 2, in which said 2-methyltricyclo[5.2.1.0$^{2,6}$]decane is selected from the group consisting of 2-endo-methyl-exo-tricyclo[5.2.1.0$^{2,6}$]decane, 2-exo-methylendo-tricyclo[5.2.1.0$^{2,6}$]decane and mixtures thereof.

6. The new compound, 2-methyl-tricyclo[5.2.1.0$^{1,6}$]decane.

* * * * *

UNITED STATES PATENT OFFICE
CERTIFICATE OF CORRECTION

Patent No. 3 894 098    Dated July 8, 1975

Inventor(s) Naotake Takaishi, Yoshiaki Inamoto and Kiyoshi Tsuchihashi

It is certified that error appears in the above-identified patent and that said Letters Patent are hereby corrected as shown below:

Col. 8, line 48; change "methyltricyclo" to

---methyl-tricyclo---.

Col. 8, line 57; change "methyltricyclo" to

---methyl-tricyclo---.

Col. 8, line 59; change "methylendo" to ---methyl-endo---.

Col. 8, line 62; change "$[5.2.1.0^{1,6}]$" to ---$[5.2.1.0^{2,6}]$---.

Signed and Sealed this twenty-first Day of October 1975

[SEAL]

Attest:

RUTH C. MASON
*Attesting Officer*

C. MARSHALL DANN
*Commissioner of Patents and Trademarks*